(12) United States Patent
Boyle et al.

(10) Patent No.: US 6,991,243 B2
(45) Date of Patent: Jan. 31, 2006

(54) PLATFORM SCOOTER FOR LARGER CHILDREN AND HANDICAPPED PERSONS

(76) Inventors: Manus J. Boyle, 1122 Covered Bridge Crossing, Orefield, PA (US) 18069; Kathleen A. Boyle, 1122 Covered Bridge Crossing, Orefield, PA (US) 18069

( * ) Notice: Subject to any disclaimer, the term of this patent is extended or adjusted under 35 U.S.C. 154(b) by 87 days.

(21) Appl. No.: 10/660,921

(22) Filed: Sep. 12, 2003

(65) Prior Publication Data

US 2005/0057012 A1  Mar. 17, 2005

(51) Int. Cl.
*B62M 1/00* (2006.01)

(52) U.S. Cl. .............................. 280/87.05; 280/87.041; 280/47.371; 280/47.38

(58) Field of Classification Search ............ 280/87.01, 280/87.021, 87.041, 87.043, 87.05, 47.34, 280/47.36, 47.371, 47.38, 47.4; D21/421, D21/423
See application file for complete search history.

(56) References Cited

U.S. PATENT DOCUMENTS

| | | | | |
|---|---|---|---|---|
| 519,443 | A * | 5/1894 | Chichester | 280/47.38 |
| 1,399,833 | A * | 12/1921 | Wiebe | 280/7.1 |
| 1,467,271 | A * | 9/1923 | Gutekunst | 280/7.1 |
| 1,658,068 | A * | 2/1928 | White | 280/87.041 |
| 1,678,836 | A * | 7/1928 | Wessborg | 280/87.043 |
| 1,793,848 | A * | 2/1931 | Gill et al. | 280/7.1 |
| 1,872,142 | A * | 8/1932 | Holtzman | 280/261 |
| D146,365 | S | 2/1947 | Kinslow | |
| 2,586,495 | A * | 2/1952 | Woods | 280/47.35 |
| D176,736 | S | 1/1956 | Rumsey | |
| D208,791 | S | 10/1967 | Purdy | |
| 3,656,777 | A * | 4/1972 | Keiser, Jr. | 280/87.043 |
| 3,659,871 | A * | 5/1972 | Hott | 280/221 |
| 4,179,134 | A | 12/1979 | Atkinson | |
| 4,623,163 | A * | 11/1986 | Potts | 280/649 |
| 4,941,670 | A * | 7/1990 | Parr | 280/87.021 |
| 4,986,563 | A | 1/1991 | Grant | |
| D328,316 | S | 7/1992 | Rogers | |
| 5,380,023 | A | 1/1995 | McBee | |
| 5,547,205 | A | 8/1996 | de Cabedo et al. | |
| 5,820,146 | A | 10/1998 | Van Ligten | |
| 5,924,713 | A * | 7/1999 | Li | 280/270 |
| 5,992,864 | A * | 11/1999 | Dickson et al. | 280/87.041 |
| D433,654 | S * | 11/2000 | Gorvine et al. | D12/107 |
| 6,149,170 | A * | 11/2000 | Dotson | 280/87.021 |
| 6,302,421 | B1 | 10/2001 | Lee | |
| 6,416,070 | B1 | 7/2002 | Lin | |
| 6,612,598 | B2 * | 9/2003 | Wu | 280/270 |
| 6,874,802 | B2 * | 4/2005 | Gunter et al. | 280/288.4 |
| 2002/0105155 | A1 | 8/2002 | Hou et al. | |
| 2003/0001351 | A1 * | 1/2003 | Schauble et al. | 280/87.05 |

* cited by examiner

*Primary Examiner*—Christopher P. Ellis
*Assistant Examiner*—Brian Swenson
(74) *Attorney, Agent, or Firm*—Sanford J. Piltch, Esq.

(57) ABSTRACT

A lightweight collapsible four-wheeled scooter with a large platform, the scooter including a height-adjustable non-steering foldable handle assembly in front for gripping by a rider, an adjustable height removable push bar extending to the rear for use by a pusher, a pair of non-swivelable wheels extending to the rear, and a pair of swivelable wheels in the front to enable steering, the scooter being capable of supporting a single standing rider or multiple standing riders, the scooter platform being capable of accommodating an optional removable seat having an optional removable carry basket.

17 Claims, 6 Drawing Sheets

PLATFORM SCOOTER FOR LARGER CHILDREN AND HANDICAPPED PERSONS

BACKGROUND OF THE INVENTION

The present invention relates generally to scooters or carts for use in transporting people. More specifically, the present invention relates to a lightweight collapsible four-wheeled scooter with a large platform, the scooter including a height-adjustable non-steering foldable handle in the front for gripping by a rider, an adjustable height removable push bar extending to the rear, a pair of non-swivelable wheels in the rear, and a pair of swivelable wheels in the front to enable steering.

Scooters or carts for transporting people are known in the prior art. While numerous configurations have been designed for this purpose, each lacks the combination of features and functionality found in the platform scooter of the present invention. In general, earlier devices such as those discussed below may be referred to as wheeled vehicles, carts, or scooters. A common difference from the present invention is that some devices may accommodate only a single rider, a sitting rider, or a standing rider. Also, some devices are not steerable or can be steered only by the rider. Further, other devices are self-propelled by the rider and do not provide means for a separate person to push the device. Further still, some devices do not provide a handlebar or grip that is adjustable to the height or size of the rider. Additionally, some devices are not readily collapsible for transport or storage.

Scooters of the most basic single person, non-steerable, self-propelled type are represented by U.S. Des. Pat. No. D176,736 [Rumsey], which shows a basic four-wheeled cart with a fixed handgrip for a rider. One possible improvement, the addition of steerability, is representatively illustrated by U.S. Des. Pat. Nos. D146,365 [Kinslow] and D208,791 [Purdy], which both provide a means, by either a fixed-height handlebar or lever, of manipulating the direction of the front wheels.

Another possible improvement, the addition of collapsibility, is illustrated by U.S. Des. Pat. No. D328,316 [Rogers], a non-steerable scooter with a foldable fixed-height front handle also including a small basket, and by U.S. Pat. No. 5,820,146 [Van Ligten], which includes an adjustable-height handle and converts into a two-wheeled luggage cart. A variation on this theme is disclosed in U.S. Pat. No. 4,179,134 [Atkinson] that shows the addition of a fixed-height handle to the front of a skateboard to create a self-propelled, steerable, single person scooter also including a brake. A variation of a different type is shown in U.S. Pat. No. 5,547,205 [do Rosario Sousa de Cabedo], intended as a luggage cart but usable as a self-propelled scooter, which includes a basket and provides a retractable seat for use when the cart is not in motion. However, all of these devices are self-propelled by the rider and include no provision for a pusher.

A wheeled vehicle of the most basic pushable type is disclosed in U.S. Pat. No. 6,416,070 [Lin], essentially a modified wheel chair with a fixed handlebar for the single seated rider to grip. A rider steerable extension of this pushable design is disclosed in U.S. Patent Application No. US 2002/0105155 A1 [Hou], which includes a fixed steering wheel and adjustable push bar, and provides transportation for a single seated child. An altogether different configuration of a pushable device for use with a single standing child is disclosed in U.S. Pat. No. 5,380,023 [McBee] and includes multiple swivelable casters. A yet different device, a pullable and steerable four-wheeled cart for transportation of a single injured athlete in the seated position is disclosed in U.S. Pat. No. 4,986,563 [Grant]. Lastly, a four-wheeled cart for a single seated rider is disclosed in U.S. Pat. No. 6,302,421 [Lee], this cart having a fixed steering wheel and push bar, as well as pedals for the rider, is capable of being both propelled and steerable either by the rider or by the pusher.

Accordingly, it is an object of the present invention to provide a four-wheeled scooter capable of carrying a single rider or multiple riders. It is also an object of the present invention to provide a four-wheeled scooter that can accommodate a rider in the standing or in the sitting position. It is a further object of the present invention to provide a four-wheeled scooter that may be either self-propelled or alternatively propelled by a person pushing or pulling the scooter from behind.

It is another object of the present invention to provide a four-wheeled scooter that may be steered by the pusher or possibly with the assistance of the rider. It is an additional object of the present invention to provide a four-wheeled scooter that includes an adjustable handlebar to accommodate riders of various heights and sizes. It is yet a further object of the present invention to provide a four-wheeled scooter that is collapsible for easy transport and storage.

Other objects will appear hereinafter.

SUMMARY OF THE INVENTION

The present invention overcomes the foregoing disadvantages inherent in the known types of scooters existing in the prior art. The present invention provides a four-wheeled platform scooter capable of transporting one or more riders in a standing position, or one or more riders in a seated position. The scooter of the present invention further includes a handlebar for gripping by the single rider or by the forwardmost of multiple riders, and additionally provides a push bar so that a person may push or pull the scooter from behind. The front wheels of the scooter swivel to enable steering by the pusher, or by the rider when there is no pusher. Additionally, the scooter is collapsible for transport by removing the rear push bar and folding the hingedly mounted handle portion downwardly and rearwardly onto the top of the platform. These objects, and others expressed or implied in this document, are accomplished by the present invention.

In the deployed state, the platform scooter is supported by four wheels, two fixed and two swivelable, and includes a base platform portion, a push bar portion, and handle portion. The non-swivelable pair of wheels is mounted directly to the rear end of the platform, and each of the two swivelable front wheels is incorporated into the handle portion of the scooter. The front-mounted forward-facing handle portion is interconnected rigidly to the platform by an insert and sleeve system, and is secured by a latching mechanism and quick release skewer similar to that used to retain bicycle wheels. The rear-mounted rearward-facing push bar portion is interconnected rigidly to the platform portion by an insert and sleeve system, and is secured by aligned pins snugly passing through both the insert and the sleeve.

The scooter should be utilized with the push bar mounted. To assist in steering, the rider can lean left or right, the shifting of the rider's weight causing the front casters to rotate slightly in the direction of leaning. The height of the handlebar is readily adjusted upward or downward by a clamping collar sleeve and telescoping insert system to accommodate various sizes and heights of riders.

With the push bar mounted, a pusher can propel the scooter forward or backward by simply grasping the push bar and walking in either direction. The pusher can steer the scooter by applying unequal pressure to one hand or the other, causing the front casters to rotate slightly in much the same way a shopping cart or a baby carriage may be steered. When a pusher is propelling the scooter, a rider may stand with both feet on the platform and one or both hands gripping the handlebar. An additional rider may stand behind the first rider with both feet on the platform and both hands on the waist or the shoulders of the first rider. Optionally, a seat may be mounted on the platform so that a rider may be seated with neither, one, or both hands gripping the handlebar while being propelled by a pusher.

For pushers of differing heights, the push bar is mounted so that the angle of the mounting may be varied so that the distal end of the push bar, the horizontal bar against which the pusher exerts his or her force, is adjusted up or down to accommodate the pusher. The proximal ends of the push bar handle are inserted into identical angle-adjustable sleeves and pinned in the selected position by a securing pin such that the height of the push bar handle is dependent upon the angle of insertion into the receiving sleeves. The push bar can be adjusted in height by removing the upper securing pin, altering the angle and reinserting the securing pin with the push bar at the newly selected position.

For transport or storage, the platform scooter may be converted to a collapsed state. The optional seat is removed from the platform. Further, the push bar is removed by extracting the securing pins and lifting the push bar upward and outward from the sleeves on the platform. Further still, the handle portion is folded to lay against the platform by first unclamping the quick release skewers and latching mechanism securing the handle portion to the platform, next lifting the handle portion upward and outward from the sleeves on the platform, then rotating the handle portion about the quick release skewers towards the top surface of the platform, and finally clamping the quick release skewers to hold the handle portion in place.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
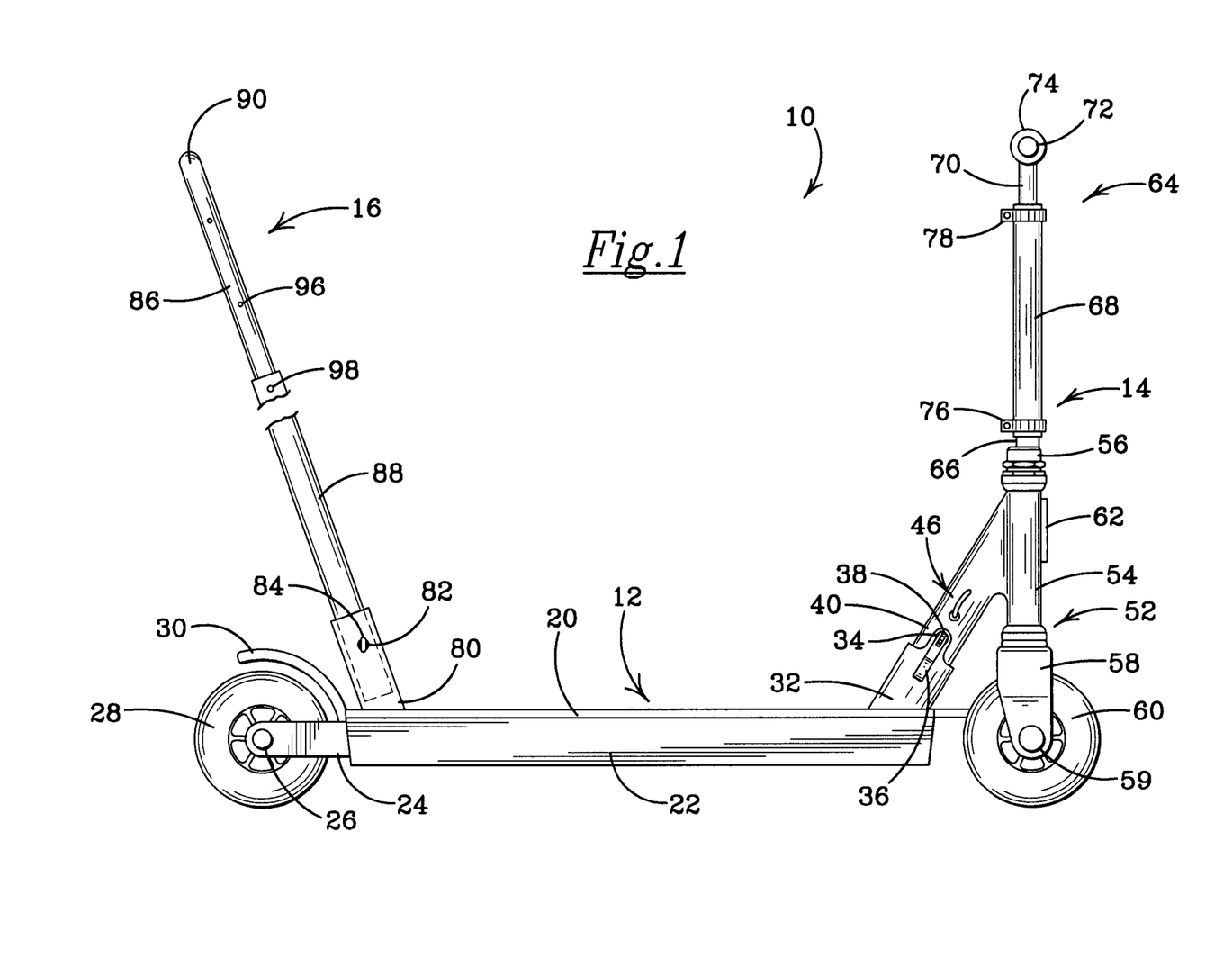
FIG. 1 is a side elevation view of the platform scooter of the present invention.
Figure 2:
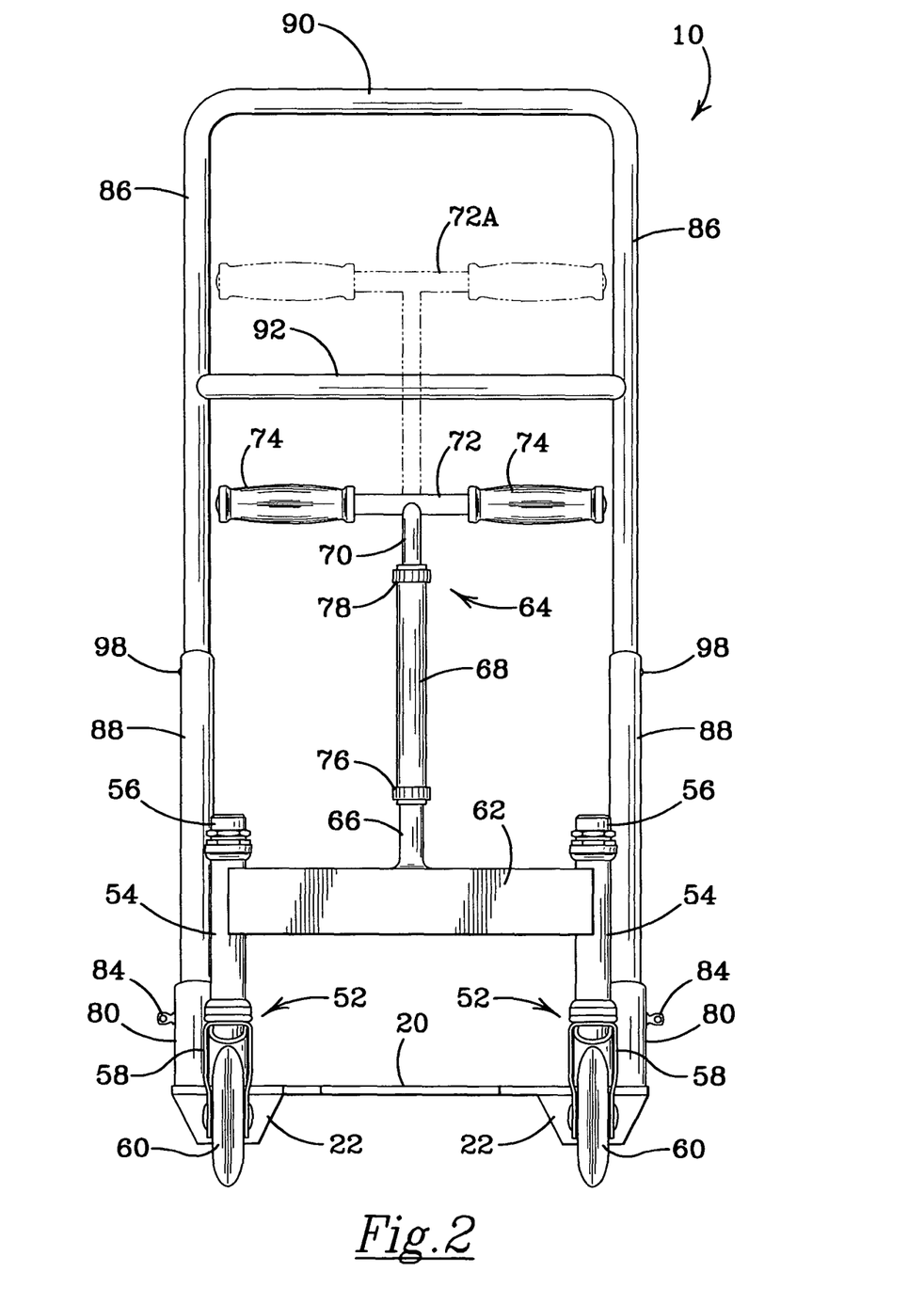
FIG. 2 is a front elevation view of the platform scooter of the present invention.
Figure 3:
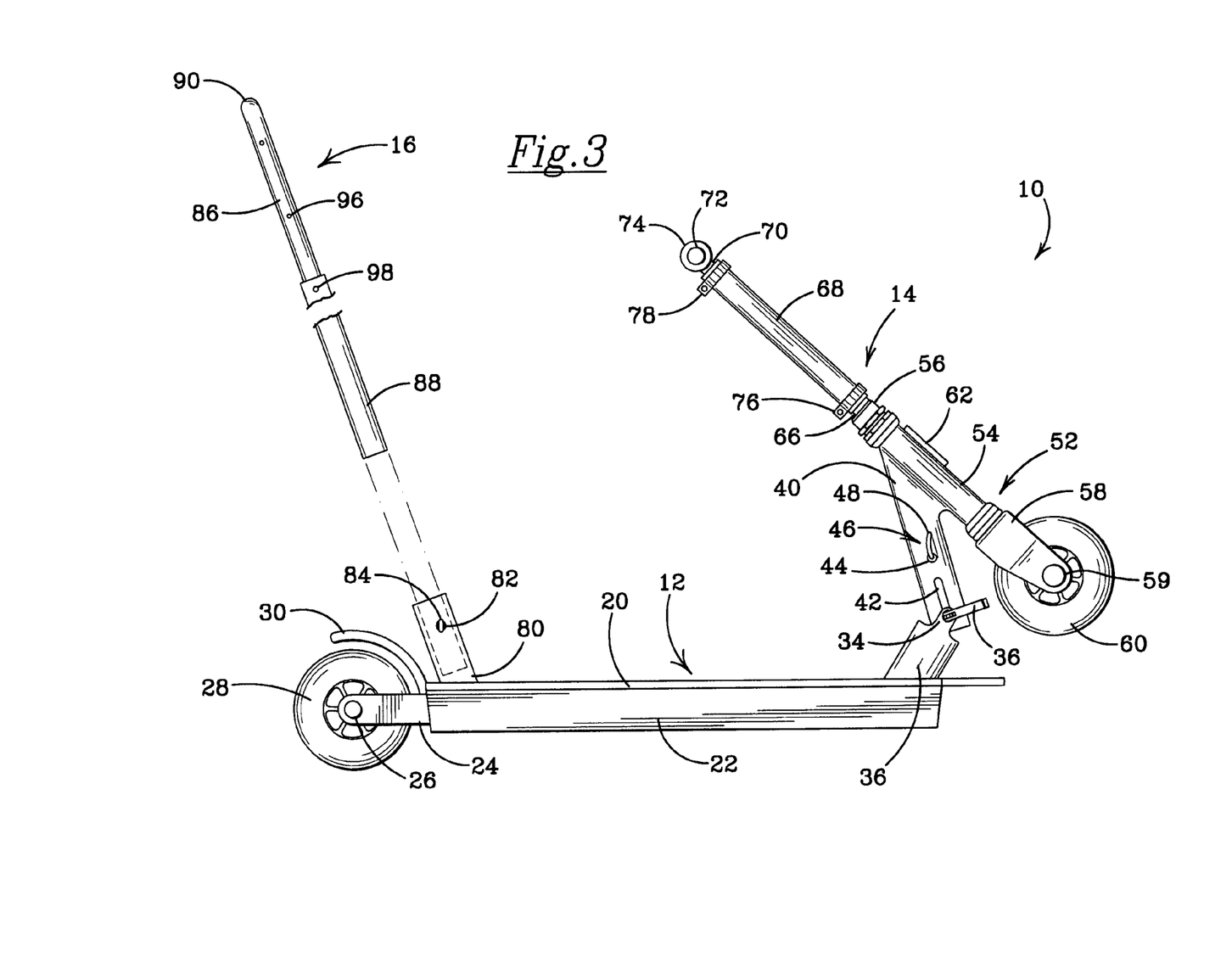
FIG. 3 is a side view of the platform scooter of the present invention showing the means for allowing collapse and storage of the platform scooter.

Referring now to the drawings in detail, where like numerals refer to like parts or elements, there is shown in FIG. 1 the platform scooter 10. The scooter 10 comprises the base portion 12, the handle portion 14, and the push bar portion 16. The scooter 10 further comprises a pair of non-swivelable rear wheels 28 and a pair of freely swivelable front wheels 60. The scooter 10 may be deployed for use as shown in FIG. 1. Additionally, it may be collapsed for transporting, or for storage, by removing the push bar portion 16 from the base portion 12 and by folding the hingedly mounted handle portion 14 inwardly towards the top side of the base portion 12, as illustrated in FIG. 3. As is shown in FIG. 2, the scooter 10 is symmetric about the longitudinal center axis, having identical, but reversed, left and right halves.

The details of the base portion 12 are best described with reference to FIGS. 1 and 2. The base portion 12 comprises the platform 20, the two reinforcing members 22, the two handle sleeves 32, the two push bar sleeves 80, the two rear wheel forks 24 holding the two rear wheels 28, and the two rear fenders 30. To achieve the desired purpose, the platform 20 of the base portion 12 must be of sufficient thickness and rigidity to support the weight of a rider. The intended rider or riders of the platform scooter 10 could be a large child, multiple small children, or a small handicapped adult, with total rider weight of not more than approximately 120 pounds. The two reinforcing members 22 run the length of the platform 20, one on the right side and the other on the left side thereof, integral with the underside thereof, providing structural support and rigidity thereto. The side reinforcing members 22 further protect the underside of the platform 20 from damage due to any upwardly protruding obstacles that the scooter 10 may run over or against during use.

Two tubular handle sleeves 32 are rigidly attached to the front portion of the top side of the platform 20 to provide a means for securing the handle portion 14 to the base portion 12. The handle sleeves 32 extend at a fixed angle upwardly and forwardly from the platform 20, with one sleeve 32 positioned on the right side of the platform 20 and the other sleeve 32 positioned symmetrically on the left side of the platform 20. The pair of handle sleeve tabs 34, integral to each handle sleeve 32 and located at the upper open end thereof, are adapted to receive the quick release skewer 36. When closed, the quick release skewer 36 squeezes the tabs 34 together against the outer surface of the handle insert 40 and provides clamping force to secure the handle insert 40 inside the handle sleeve 32. When the quick release skewer 36 is opened, the clamping pressure is relieved and the handle insert 40 may be moved inwardly or outwardly or rotationally with respect to the handle sleeve 32 as will be described in more detail following. The quick release skewer 36, well known in the art, is similar to those used to retain bicycle wheels and it is therefore deemed unnecessary to describe this element of the invention in further detail.

Two tubular push bar sleeves 80 are rigidly attached to the rear portion of the top side of the platform 20 to provide a means for securing the push bar portion 16 to the base portion 12. The push bar sleeves 80, as shown in FIGS. 1–4, extend at a fixed angle upwardly and rearwardly from the platform 20, with one sleeve 80 positioned on the right side of the platform 20 and the other sleeve 80 positioned symmetrically on the left side of the platform 20. A pair of through holes 82 near the upper open end of each push bar sleeve 80 are adapted to receive the push bar securing pin 84. When an end of the push bar 86 is inserted into one of the push bar sleeves 80, the securing pin 84 fits snugly through the holes 82 in the push bar sleeve 80 and through similar aligned holes in the other push bar sleeve (not illustrated) near the end of the push bar 86 to prevent the push bar 86 from being pulled out from the push bar sleeve 80. When the securing pins 84 are removed, the push bar 86 may be moved inwardly or outwardly with respect to the push bar sleeve 80 for purposes of assembly and disassembly, respectively, of the platform scooter 10.

Two rear wheel forks 24 extend rearwardly from the back end of the base portion 12, each fork 24 being rigidly secured to both the platform 20 and one of the reinforcing members 22 running along underneath the sides of the platform 20. The structural members of the rear fork 24 possess sufficient strength and stiffness to support the weight of a rider or multiple riders. The rear fork 24 supports the rear wheel assembly 28, comprising an axle, bearings, and a wheel, the axle being secured into the through holes 26 in the rear fork 24. Since such wheel and axle assemblies are common, it is believed unnecessary to show the details of this assembly. The rear wheel assemblies 28 cannot swivel with respect to the platform 20 but are rigidly mounted so that the wheels roll on the ground as the scooter 10 moves in a generally longitudinal direction, forward and backward.

Two rear fenders 30, positioned over the two rear wheels 28, are attached to the rear edge of the platform 20 and are formed to follow the curvature of the rear wheels 28. The rear fenders 30 prevent a rider from accidentally stepping on one of the rear wheels 28 and also prevent any road debris or water from being lifted or spun up by the rear wheels 28 towards the rider. Additionally, the fenders 30 add visual appeal to the overall appearance of the platform scooter 10.

In the preferred embodiment of the body portion 12, the platform 20 and the reinforcing members 22 are fabricated from one piece of sheet steel, with the edges of the platform 20 being rolled under and up to form the reinforcing members 22. The steel handle sleeves 32 are fabricated from a section of heavy walled rectangular tube with rounded corners having one end cut at an angle of approximately 30 degrees from the perpendicular and the other end cut to form the two tabs 34, each tab 34 having a through hole 38 for receiving the quick release skewer 36. The angle cut end of each handle sleeve 32 is welded to the front portion of the top surface of the platform 20 so that the handle sleeve 32 extends upwardly and forwardly therefrom. The steel push bar sleeves 80 are fabricated from a section of heavy walled round tube or pipe having one end cut at an angle of approximately 30 degrees from the perpendicular and the other end cut perpendicular, further including two through holes 82 for receiving the securing pin 84. The angle cut end of each push bar sleeve 80 is welded to the rear portion of the top surface of platform 20 so that the push bar sleeve 80 extends upwardly and rearwardly therefrom. The steel rear wheel forks 24 are fabricated from rectangular bar stock and include through holes 26 for receiving the axle of the rear wheel assembly 28. Each rear wheel fork 24 is welded to both the platform 20 and the one of the reinforcing members 22 and extends rearwardly from the platform 20. The steel rear fenders 30 are welded to the rear of the platform 20 between the legs of each rear wheel fork 24 to project rearwardly over the rear wheels 28.

As an alternative to the welded steel construction, the entire base portion 12 comprising the platform 20, the reinforcing members 22, the handlebar sleeves 32, the push bar sleeves 80, the rear wheel forks 24, and the rear fenders 30 could be fabricated as one integral piece from a composite material such as carbon fiber, fiber glass, or a sufficiently strong and rigid plastic material. As another alternative, the reinforcing members 22, the handlebar sleeves 32, the push bar sleeves 80, the rear wheel forks 24, and the rear fenders 30 may be fabricated as separate parts, from the same or different materials, and each bolted individually to the platform 20 to form the base portion 12.

The push bar portion 16 comprises an upper push bar section 86, a lower push bar section 88, a push bar handle 90, and a push bar cross member 92. The upper push bar 86 is fabricated from a piece of steel tube or pipe bent into a U-shape to create the push bar handle 90 in between two equal length push bar legs 86. The cross member 92 is rigidly attached to both of the push bar legs 86 near their respective midpoints to impart structural rigidity to the push bar portion 16. The length of the push bar handle 90 equals the distance between the two push bar sleeves 80 that extend upwardly and rearwardly from the top surface of the platform 20. The outer diameter of the upper push bar legs 86 is slightly less than the inner diameter of the lower push bar 88 so that the upper push bar legs 86 can slide inwardly and outwardly into and out of the lower push bar legs 88, creating a telescoping motion for adjusting the height of the push bar 16. A spring lock 96 formed into the lower end of the upper push bar legs 86 on the outward facing surface cooperates with a series of apertures 98 on the lower push bar legs 88 to lock the upper and lower push bar legs 86, 88 in a selected position to achieve the desired height of the push bar 16. The lower push bar legs 88 have an outer diameter that is slightly less than the inner diameter of the sleeves 80. The end of each lower push bar leg 88 is capable of being inserted into one of the push bar sleeves 80, which aligns with the through hole 82 in the push bar sleeve 80, for receiving the securing pin 84. When the push bar portion 16 is mounted to the base portion 12 in this manner, the push bar handle 90 may be pushed and pulled by a person to propel the scooter 10 in the forward and reverse directions, respectively. In the preferred embodiment, the steel cross member 92 is welded to the steel upper push bar 86.

The handle portion 14 comprises two front casters 52 with swivelable front wheels 60, a pair of handle inserts 40 each rigidly connected to the corresponding front caster 52 and adapted to be received by one of the handle sleeves 32 on the platform 20, a handle cross member 62 rigidly interconnecting between the two front casters 52, and an adjustable handlebar assembly 64 rigidly mounted to the cross member 62 and extending upwardly therefrom.

Each front caster 52 is a double bearing design well known in the art and therefore it is believed unnecessary to describe in detail every component of the casters 52. Comprising the caster 52 are components including the bearing sleeve 54, the bearing shaft 56, the front wheel fork 58, and the front wheel assembly 60. The bearing sleeve 54 provides the outer races for the two internal bearings located near the ends thereof, as well as the mounting surfaces for attachment of the caster 52 to the handle insert 40 and the handle cross member 62. The bearing shaft 56 is held concentrically within the bearing sleeve 54 and provides the inner races for the two internal bearings so that the bearing shaft 56 can rotate freely within the bearing sleeve 54. In the preferred embodiment, the bearings are tapered roller bearings to provide both axial support and rotational freedom. Attached rigidly to the lower end of the bearing shaft 56 is the front wheel fork 58, comprising two structural members with sufficient strength and stiffness to support the weight of a rider, the front wheel fork 58 rotating together with the bearing shaft 56.

The front fork 58 supports the front wheel assembly 60, comprising an axle, bearings, and a wheel, the axle being secured into the through holes 59 in the front fork 58. Since such wheel and axle assemblies are common, and since the front wheel assembly 60 is identical to the rear wheel assembly 28, it is believed unnecessary to show the details of this assembly. The handle cross member 62 is rigidly connected to the bearing sleeve 54 of each caster 52 so that the front wheels 60 extend downwardly therefrom when the handle portion 14 is assembled to the deployed scooter 10.

The adjustable handlebar assembly 64, which provides a gripping point and support for a rider but is not used to steer the scooter 10, enables the scooter 10 to accommodate riders of various sizes and heights. The handlebar assembly 64 comprises the handlebar 72, the upper handle stem 70, the handle extender tube 68, and the lower handle stem 66. The round tubular upper handle stem 70 is rigidly connected to the midpoint of the round tubular handlebar 72, extending outwardly therefrom to form a symmetric T-shape. When assembled to the deployed scooter 10, the handlebar 72 is mounted in a horizontal position and includes hand grips 74 at either end, and the upper handle stem 70 extends vertically downward. The round tubular lower handle stem 66 is rigidly connected to the midpoint of the handle cross member 62, extending upwardly therefrom to form a symmetric T-shape. The lower handle stem 66 extends away from the cross member 62 in the opposite direction from the casters 52. The lower handle stem 66 and the upper handle stem 70 are fabricated from the same diameter tube.

The handle extender tube 68 telescopically interconnects between the lower handle stem 66 and the upper handle stem 70. The inner diameter of the handle extender tube 68 is slightly larger than the outer diameter of both the lower handle stem 66 and the upper handle stem 70, and therefore the lower stem 66 and the upper stem 70 can slide readily into and out of the extender tube 68. The position of the lower stem 66 within the extender tube 68 is secured by tightening the lower stem collar 76, which squeezes the inner surface of the lower end of the extender tube 68 against the outer surface of the lower stem 66. The position of the upper stem 70 within the extender tube 68 is secured by tightening the upper stem collar 78, which squeezes the inner surface of the upper end of the extender tube 68 against the outer surface of the upper stem 70. Therefore, the height of the handlebar assembly 64 is infinitely adjustable, with the maximum height being nearly the sum of the lengths of the lower stem 66, the extender tube 68, and the upper tube 70, and the minimum height being shorter than the maximum height by approximately the length of the extender tube 68. See the phantom extended height handlebar 72A in FIG. 2. It is noted that other equivalent means of achieving longitudinal adjustment may be used, such as pins or threaded connections.

To provide a collapsible means for attachment of the handle portion 14 to the base portion 12, the handle insert 40 is rigidly attached to the rear portion of each front caster 52, extending rearwardly and downwardly therefrom. The handle insert 40 is fabricated from tubular material of the same cross sectional geometry as the handle sleeve 32 but having outer dimensions slightly smaller than the inner dimensions thereof, enabling the handle insert 40 to slide smoothly but snugly into the handle sleeve 32.

The handle insert 40 includes a longitudinal through slot 42 (best seen in FIG. 3) adapted for receiving the quick release skewer 36 and a through hole 44 adapted for receiving the latching mechanism 46. The slot 42 enables the handle insert 40 to have a limited range of movement with respect to the handle sleeve 32, when the quick release skewer 36 is inserted, so that the handle portion 14 may be rotated about the base portion 12 and collapsed for storage or deployed for use. When stowed for storage, the handle portion 14 is secured in position by clamping down the quick release lever 36. When deployed for use, the clamping force of the quick release lever 36 is insufficient to support the weight of a rider and therefore the handle portion 14 is additionally locked into place by the latching mechanism 46.

The latching mechanism 46 is rotatably mounted into through holes 44 near the slot 42 in the handle insert 40, the through holes 44 being positioned between the caster 52 and the slot 42. The latching mechanism 46 includes a latching hook 50 (not illustrated) which is located internal to the tubular handle insert 40, extending downwardly towards the slot 42. The latching mechanism 46 further includes a latch lever 48 which, when actuated, swivels the latching hook 50 inside the tubular handle insert 40.

When the handle portion 14 is rotated into its deployed position about the base portion 12 and the handle insert 40 is inserted fully into the handle sleeve 32 as limited by the slot 42 and the quick release skewer 36, the quick release skewer 36 is clamped and the latch lever 48 is actuated thereby rotating the latching hook 50 to engage the quick release skewer 36. The positive latching action of the latching hook 50 with the quick release skewer 36 enables the scooter 10 to support the weight of a rider, preventing the tendency of the handle insert 40 to slide outwardly from the handle sleeve 32 which could occur if the handle insert 40 were to be held in place only by the clamping force of the quick release skewer 36.

In order to rotate the handle portion 14 into its stowed position, the latch lever 48 is deactuated, disengaging the latching hook 50 from the quick release skewer 36, the quick release skewer 36 is unclamped, the handle insert 40 slides outwardly fully from the handle sleeve 32 as limited by the slot 42 and the quick release skewer 36, and the handle portion 14 is free to rotate about the quick release skewer 36 inwardly towards the top of the platform 20 of the base portion 12.

In the preferred embodiment of the handle portion 14, the steel handle inserts 40 are fabricated from a section of heavy walled rectangular tube with rounded corners having one end cut at an angle of approximately 60 degrees from the perpendicular and the other end cut perpendicular. The angle cut end of each handle insert 40 is welded to the rear of the steel bearing sleeve 54 of the corresponding caster 52 so that the handle insert 40 extends downwardly and rearwardly therefrom. The handle cross member 62 is fabricated from steel angle with both ends cut square, and is welded at each end to the steel bearing sleeve 54 of one of the casters 52 with the flat faces of the angle oriented to face forward and upward. The round tubular steel lower handle stem 66 is welded to the midpoint of the top face of the handle cross member 62 to extend upwardly therefrom. The round tubular steel upper handle stem 70 is welded to the midpoint of the round tubular steel handlebar 72 to extend downwardly therefrom. The round tubular handle extender tube 68 and the clamping collars 76, 78 may be fabricated from steel or from a sufficiently rigid composite material, as desired.

When assembled and deployed for use, the scooter 10 may carry a rider or multiple riders, and is propelled in the forward or reverse direction by a pusher. The sole rider, or the front rider of multiple riders, may adjust the handlebar assembly 64 to the appropriate height by loosening the upper stem collar 78 and the lower stem collar 76, sliding the upper handle stem 70 and the lower handle stem 66 inward or outward with respect to the handle extender tube 68 as required, and then tightening the upper collar 78 and the lower collar 76 to secure the handlebar assembly 64 as a rigid structure with the handlebar 72 at the desired height. The pusher, while gripping the push bar handle 90, drives the scooter 10 forward or backward, and may steer the scooter 10 by exerting lateral pressure on the push bar handle 90 causing the swivelable front wheels 60 to turn toward the desired direction of travel, in much the same way as a shopping cart or baby carriage is steered.

Figure 4:
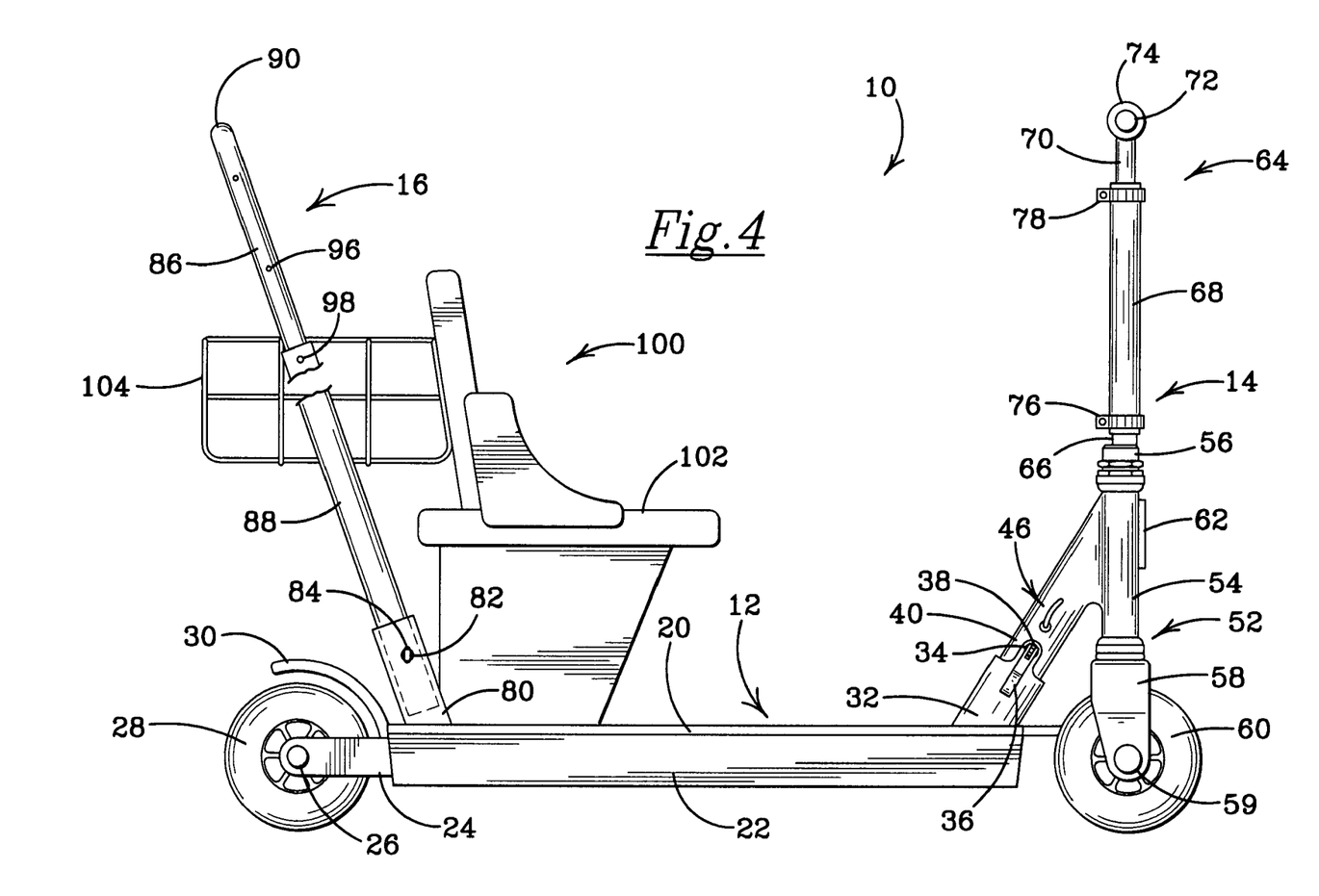
FIG. 4 is a side view of the platform scooter of the present invention showing a seat and carry basket mounted to the platform.

With reference to FIG. 4, a modified embodiment of the scooter 10 includes a seat assembly 100, comprising a seat 102 and optionally a basket 104. The seat assembly 100 is attached to the top surface of the platform 20 by bolting or equivalent removable means, and is positioned to allow the seated rider to reach the handlebar 72. The seat assembly 100 expands the range of potential riders of the scooter 10 to include handicapped persons who are unable to stand or small children who are too old or too large for a stroller but may be too tired to stand or walk. The basket 104 optionally incorporated into the rear of the seat 102 enables the scooter 10 to be used for shopping or to carry items during a walk in the park or around the neighborhood.

The scooter 10 is readily disassembled and collapsed for storage or transport. The optional seat assembly 100, if installed, is first detached from the platform 20. The push bar securing pins 84 are removed and the push bar portion 16 is pulled upward and outward from the base portion 12, sliding the lower push bar legs 88 out from the push bar sleeves 80. The quick release skewers 36 are unclamped and the latching mechanism 46 is deactuated, allowing the handle portion 14 to slide freely upward and outward from the base portion 12. The handle portion 14 is pulled upward and outward until the quick release skewers 36 mounted in the handle sleeves 32 contact the ends of the slots 42 in the handle inserts 40, and the handle portion 14 is then rotated about the quick release skewers 36 until the handlebar 72 rests on the top surface of the platform 20. The quick release skewers 36 are clamped to secure the handle portion 14 in the stowed position with respect to the base portion 12. Reassembly of the scooter 10 is the reverse of disassembly.

Figure 5:
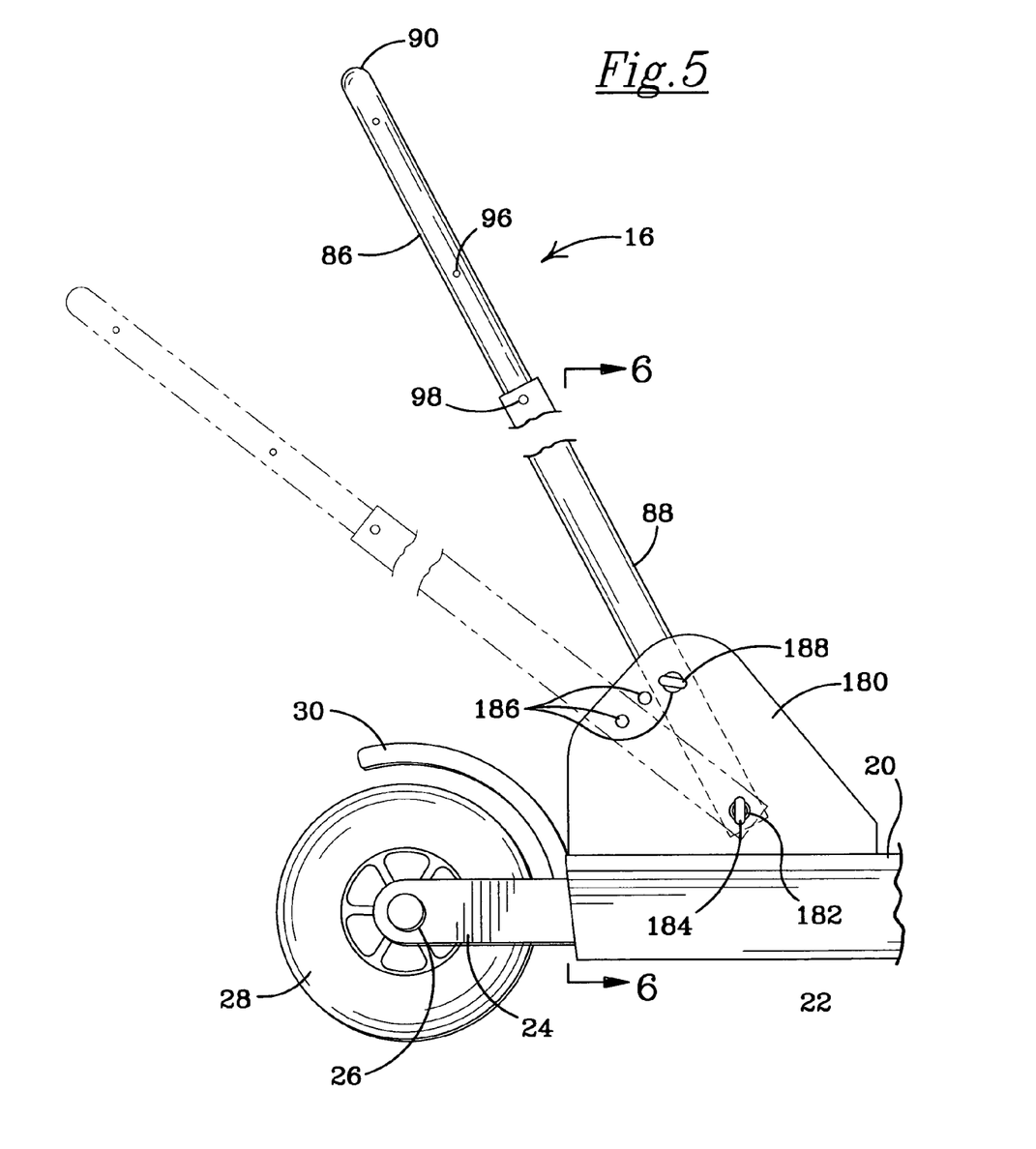
FIG. 5 is an enlarged view of the rear portion of the platform showing one of the push bar receiving sleeves and bracket.

In another alternate embodiment, the push bar 16 is also made to be adjustable by varying the angle at which it attaches to the scooter 10. Referring to FIG. 5, the push bar 16 is inserted into a modified push bar sleeve or bracket 180 by inserting the lower push bar legs 88 into the modified push bar sleeve 180 and securing the push bar 16 within the sleeve 180 by inserting the push bar securing pin 184 through the cooperating apertures in both the sleeve 180 and the lower push bar legs 88. The push bar height is then adjustable by moving the push bar 16 into one of several positions provided in the modified push bar sleeve 180. The several positions, three positions being shown in FIG. 5, are arrayed along the upper edge portion of the modified push bar sleeve 180 and are comprised of a series of apertures 186 and a second push bar securing pin 188 and a series of cooperating cylindrical openings 190 arrayed along the interior of the modified push bar sleeve 180.

Figure 6:
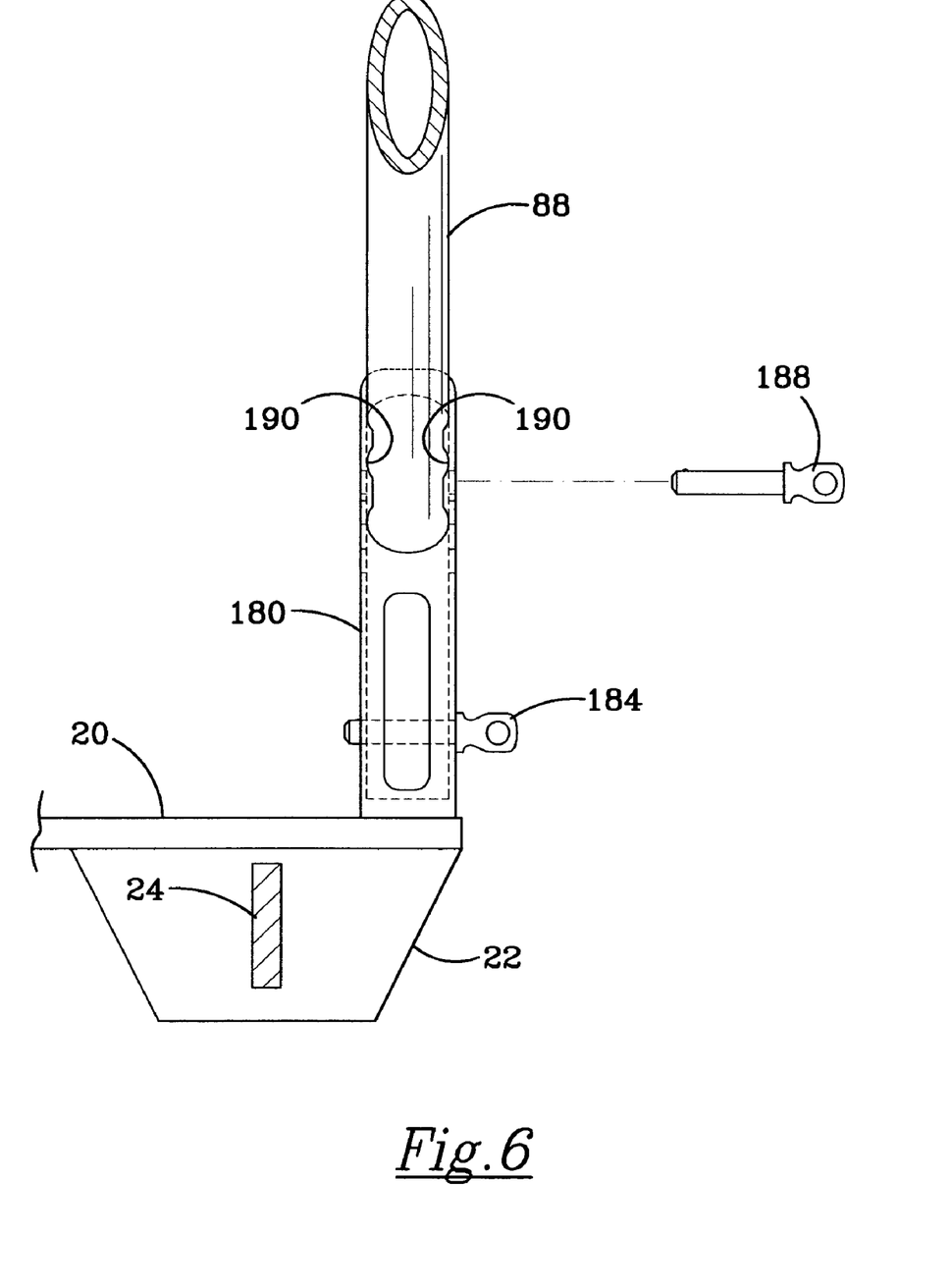
FIG. 6 is a sectional view taken along LINE 6—6 of FIG. 5 showing the receiving sleeve and bracket and securing pins for modifying the height of the push bar.

Each of the cylindrical openings 190 is sized to approximate the outer dimension of the lower push bar legs 88 and are positioned to allow the second push bar securing pin 188 to be placed through the modified sleeve apertures 186 and cooperating apertures (not shown) in the lower push bar legs 88. In this manner, the push bar 16 can be adjusted for vertical height by angularly rotating its lower end about the securing pin 184 and retaining the push bar in the selected position by inserting the second push bar securing pin 188 through the cooperating apertures in the selected position. To assist in this procedure, the cylindrical openings 190 are able to retain the push bar 16 in the selected position until the second securing pin 188 has been inserted as shown in FIG. 6.

The modified push bar sleeves or bracket 180 may be made from the same materials as described above, or from an extruded plastic have minimal elastic characteristics providing for the slight expansion of the walls of the sleeves 180 as the lower push bar legs 88 are repositioned from one cylindrical opening to another. This would be accomplished without the removal of the push bar 16 from the modified sleeve 180 and with the push bar securing pin 184 remaining in place. Alternatively, if the modified sleeve is made from the metal material described above, the push bar 16 is removed from one position in the modified sleeve 180 by removing the securing pin 184, repositioned into another cylindrical opening 190, and both the securing pin 184 and the second securing pin 188 placed through the modified sleeve 180 and the lower push bar legs 88 to secure the push bar 16 in its new position. When removing the push bar 16 from the scooter 10, the securing pin 184 and the second securing pin 188 are removed from the modified sleeve 180 and the push bar 16 withdrawn from the cylindrical opening 190 in the modified push bar sleeves 180 so that the scooter 10 can be stowed as described above.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

What is claimed is:

1. A scooter for carrying a person or persons, comprising:
   a rigid base platform having a top, a bottom, a front, a rear, and symmetric left and right sides;
   a pair of non-swivable rear wheels rigidly mounted to the rear of said platform and extending rearwardly and downwardly;
   a handle portion having upper and lower ends;
   an adjustable handlebar assembly rigidly mounted to the upper end of said handle portion, said handle portion includes a telescopic height adjustable means for adjusting the position of said handlebar assembly to accommodate differently sized riders;
   a pair of swivable front wheels rigidly mounted to the lower end of said handle portion;
   a push bar having a mounting portion and an opposed push bar handle for gripping by a person pushing said scooter;
   a means for rigidly attaching said handle portion to said base platform near the front thereof with said handlebar assembly extending upwardly therefrom and said front wheels extending downwardly therefrom, said handle attachment means being engageable to deploy said handle portion for riding of said scooter or disengageable to stow said handle portion for storage of said scooter; and a means for rigidly attaching the mounting portion of said push bar to said base platform near the rear thereof, with said push bar extending upwardly and rearwardly therefrom.

2. The scooter of claim 1, wherein said telescopic height adjustment means comprises a round tubular sleeve, a round tubular insert adapted for inserting into said tubular sleeve, and a clamping collar capable of compressing the end of said tubular sleeve against said tubular insert when said tubular insert is positioned as desired within said tubular sleeve.

3. The scooter of claim 1, wherein said handle attachment means comprises at least one handle sleeve having an open end extending upwardly and forwardly from said base platform, at least one mating handle extending downwardly and rearwardly from said handle portion, and a quick release skewer; each said handle sleeve corresponding to and being capable of receiving one of said at least one mating handle inserts, said handle sleeve being adapted for retaining said quick release skewer, said handle insert being adapted for receiving said quick release skewer and having a latching mechanism for engaging said quick release skewer.

4. The scooter of claim 1, further comprising a height adjustment means for the push bar for adjusting the vertical height of the push bar handle such that the each side of the push bar has a tubular insert cooperating with a tubular receiver permitting the telescoping inward and outward of the push bar handle, and a locking means for retaining the push bar handle in position.

5. The scooter of claim 1, further comprising a pair of rear fenders mounted to the rear of said base platform, one said fender projecting around and over each of said rear wheels.

6. The scooter of claim 1, wherein said push bar attachment means may be engaged to deploy said push bar for pushing said scooter, or disengaging to remove said push bar for storage of said scooter.

7. The scooter of claim 6, wherein said push bar attachment means comprises at least one push bar sleeve having an open end extending upwardly and rearwardly from said platform, and at least one securing means; said push bar sleeve being capable of receiving said mounting portion of said push bar; said securing means, when engaged, retaining said push bar mounting portion inside said mounting sleeve; said securing means, when disengaged enabling said push bar to be removed from said push bar sleeve.

8. The scooter of claim 1, further comprising a seat, and a means for removably attaching said seat to said base platform.

9. The scooter of claim 8, further comprising a carry basket mounted to said seat.

10. A method of deploying a collapsible, four-wheeled scooter comprising a rigid base platform having a top, a bottom, a front, and a rear, and symmetric left and right sides; a pair of non-swivelable rear wheels rigidly mounted to the rear of said platform and extending rearwardly and downwardly; a handle portion having upper and lower ends; a handlebar rigidly mounted to the upper end of said handle portion; a pair of swivelable front wheels rigidly mounted to the lower end of said handle portion; a push bar having a mounting portion and an opposed push bar handle for gripping by a person pushing said scooter; a pivotable means for rigidly attaching said handle portion to said base platform near the front thereof with said handlebar assembly extending upwardly therefrom and said front wheels extending downwardly therefrom; and a means for rigidly attaching the mounting portion of said push bar to said base platform near the rear thereof, with said push bar extending upwardly and rearwardly therefrom; said method comprising the steps:

engaging said push bar attachment means to secure said push bar to said base platform;

disengaging said pivotable attachment means to release said handle portion from the stowed position;

pivoting said handle portion about said pivotable attachment means frontwardly away from the top of said base platform;

re-engaging said pivotable attachment means to secure said handle portion in the deployed position; and securing means to retain said push bar inside said push bar sleeve; and extending said adjustable handle to a desired length.

11. The method of claim 10, further comprising the step of adjusting the vertical height of the push bar handle by releasing a locking means for retaining the push bar handle in position, telescoping the push bar handle inward and outward, and re-engaging the locking means to retain the push bar in the desired position.

12. The method of claim 10, further comprising the step of adjusting the vertical height of the push bar handle by releasing a locking means, altering the angle of the push bar handle to the base platform by re-aligning the push bar handle within the push bar attachment means and re-engaging the locking means to retain the push bar handle in the desired position.

13. The method of claim 10, further including the step of removably mounting a seat to the top of said base platform.

14. The method of claim 13, further including the step of removably mounting a carry basket to said seat.

15. A method of stowing a collapsible, four-wheeled scooter comprising a rigid base platform having a top, a bottom, a front, and a rear, and symmetric left and right sides; a pair of non-swivelable rear wheels rigidly mounted to the rear of said platform and extending rearwardly and downwardly; a handle portion having upper and lower ends; a handlebar rigidly mounted to the upper end of said handle portion; a pair of swivelable front wheels rigidly mounted to the lower end of said handle portion; a push bar having a mounting portion and an opposed push bar handle for gripping by a person pushing said scooter; a pivotable means for rigidly attaching said handle portion to said base platform near the front thereof with said handlebar assembly extending upwardly therefrom and said front wheels extending downwardly therefrom; and a means for rigidly attaching the mounting portion of said push bar to said base platform near the rear thereof, with said push bar extending upwardly and rearwardly therefrom; said method comprising the steps:

shortening said adjustable handle to the minimum length thereof;

disengaging said pivotable attachment means to release said handle portion from the deployed position;

pivoting said handle portion about said pivotable attachment means rearwardly towards the top of said base platform;

re-engaging said pivotable attachment means to secure said handle portion is a stowed position; and disengaging said push bar attachment means to remove said push bar from said push base platform.

16. The method of claim 15, further comprising the step of collapsing said push bar handle to its minimum extension prior to removing said push bar from said base platform.

17. The method of claim 15, wherein said scooter further comprises a seat removably mounted to the top of said base platform, said seat optionally including a carry basket, said method further including the step of unmounting said seat from said base platform.

* * * * *